United States Patent
Kraus et al.

(10) Patent No.: US 11,750,007 B2
(45) Date of Patent: Sep. 5, 2023

(54) SYSTEM FOR PRESERVING THE CHARGE OF A MOTOR VEHICLE BATTERY

(71) Applicant: REV Ambulance Group Orlando, Inc., Winter Park, FL (US)

(72) Inventors: Kevin Thomas Kraus, Orlando, FL (US); Christopher Lee Ellis, Orlando, FL (US)

(73) Assignee: REV Ambulance Group Orlando, Inc., Winter Park, FL (US)

( * ) Notice: Subject to any disclaimer, the term of this patent is extended or adjusted under 35 U.S.C. 154(b) by 10 days.

(21) Appl. No.: 17/393,177

(22) Filed: Aug. 3, 2021

(65) Prior Publication Data

US 2022/0045531 A1 Feb. 10, 2022

Related U.S. Application Data

(60) Provisional application No. 63/062,072, filed on Aug. 6, 2020.

(51) Int. Cl.
*H02J 7/00* (2006.01)
*B60R 16/033* (2006.01)

(52) U.S. Cl.
CPC .......... *H02J 7/0063* (2013.01); *B60R 16/033* (2013.01)

(58) Field of Classification Search
CPC .............................. H02J 7/0063; B60R 16/033
USPC ........................................................ 307/10.1
See application file for complete search history.

(56) References Cited

U.S. PATENT DOCUMENTS

| | | |
|---|---|---|
| 1,014,300 A | 1/1912 | Hart |
| 1,071,737 A | 9/1913 | Hart |
| 1,103,199 A | 7/1914 | Hart |
| 1,326,359 A | 12/1919 | Mahoney |
| 2,632,821 A | 3/1953 | Wright et al. |
| 3,101,434 A | 8/1963 | Kitscha |
| 3,235,777 A | 2/1966 | Hatashita |
| 3,462,647 A | 8/1969 | Russell |
| 3,474,296 A | 10/1969 | Rickey |
| 3,503,021 A | 3/1970 | De Bruin et al. |
| 3,522,481 A | 8/1970 | Terzic |

(Continued)

OTHER PUBLICATIONS

Gigavac®, "Automated LVD Connection & Setup," <https://www.gigavac.com/sites/default/files/MXSL_LVD_Install-Setup.pdf>, Documentation Revision 1, Products models: MXSL15/16 series, LVD (Low Volts Disconnect) Functions, publicly available at least as early as Jul. 8, 2020 (8 pages).

(Continued)

*Primary Examiner* — Michael R. Fin
(74) *Attorney, Agent, or Firm* — Michael Best & Friedrich LLP

(57) ABSTRACT

A motor vehicle includes a chassis supported on wheels, a battery having a voltage and supported by the chassis, a first electrical circuit supported on the chassis and configured to receive current from the battery, and a second electrical circuit supported on the chassis and configured to receive current from the battery. The second electrical circuit includes a current disconnect that is switchable between an open condition, in which the second electrical circuit is disconnected from the battery when the voltage falls below a voltage threshold, and a closed condition, in which the second electrical circuit is connected to the first electrical circuit when a reset condition occurs.

20 Claims, 3 Drawing Sheets

(56) References Cited

U.S. PATENT DOCUMENTS

| | | |
|---|---|---|
| 3,571,707 A | 3/1971 | Houck |
| 3,623,131 A | 11/1971 | Russell |
| 3,646,354 A | 2/1972 | Von Brimer |
| 3,648,145 A | 3/1972 | Meyer et al. |
| 3,656,045 A | 4/1972 | Frezzolini et al. |
| 3,893,053 A | 7/1975 | Onatsevich |
| 4,005,344 A | 1/1977 | Gaind et al. |
| 4,137,557 A | 1/1979 | Ciarniello et al. |
| 4,218,717 A | 8/1980 | Shuster |
| 4,313,079 A | 1/1982 | Lee |
| 4,412,267 A | 10/1983 | Hansen |
| 4,493,001 A | 1/1985 | Sheldrake |
| 4,682,289 A | 7/1987 | Nishihara |
| RE32,793 E | 11/1988 | Baker et al. |
| 4,902,956 A | 2/1990 | Sloan |
| 4,950,913 A | 8/1990 | Kephart |
| 5,089,762 A | 2/1992 | Sloan |
| 5,200,877 A | 4/1993 | Betton et al. |
| 5,327,068 A | 7/1994 | Lendrum et al. |
| 5,381,295 A | 1/1995 | Rund et al. |
| 6,066,899 A | 5/2000 | Rund et al. |
| 7,460,344 B2 | 12/2008 | Hastings et al. |
| 9,240,686 B2 * | 1/2016 | Bajjuri ............ B60L 58/25 |
| 2007/0007053 A1 * | 1/2007 | Abel ............ B60P 1/14 180/22 |
| 2009/0212740 A1 * | 8/2009 | Felps ............ H02J 9/002 320/134 |
| 2012/0013175 A1 * | 1/2012 | Newman, Jr. ...... B60R 16/033 320/109 |

OTHER PUBLICATIONS

Gigavac®, "Automated Low Voltage Disconnect MXSL15 Smart-Tractor™," <https://www.gigavac.com/sites/default/files/catalog/spec_sheet/MXSL15_DATASHEET_REV_B.pdf>, Datasheet, Rev B, dated Nov. 15, 2019 (2 pages).

* cited by examiner

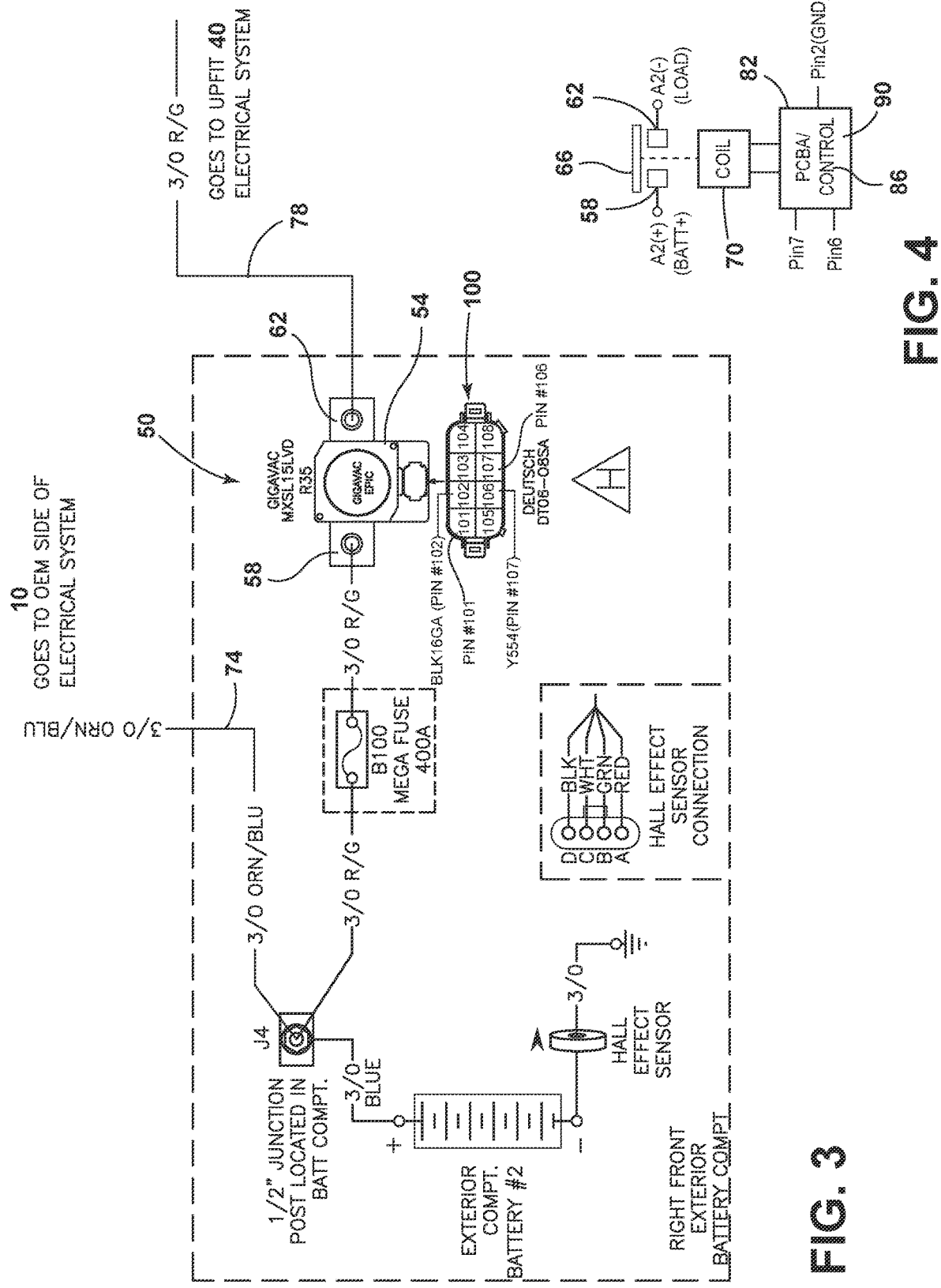

SYSTEM FOR PRESERVING THE CHARGE OF A MOTOR VEHICLE BATTERY

CROSS-REFERENCE TO RELATED APPLICATIONS

This application claims priority to prior-filed U.S. Provisional Patent Application No. 63/062,072, filed on Aug. 6, 2020, the entire contents of which are incorporated by reference.

BACKGROUND

The present invention relates to devices, systems, and methods for preserving the charge of a motor vehicle battery.

SUMMARY

In one aspect, the invention provides a motor vehicle including a chassis supported on wheels, a battery having a voltage and supported by the chassis, a first electrical circuit supported on the chassis and configured to receive current from the battery, and a second electrical circuit supported on the chassis and configured to receive current from the battery. The second electrical circuit includes a current disconnect that is switchable between an open condition, in which the second electrical circuit is disconnected from the battery when the voltage falls below a voltage threshold, and a closed condition, in which the second electrical circuit is connected to the first electrical circuit when a reset condition occurs.

In another aspect, the invention provides a method of selectively powering an aftermarket electrical system for a motor vehicle using a battery of the motor vehicle. The method includes supplying a voltage from the battery to the aftermarket electrical system when the voltage of the battery is above a voltage threshold, disconnecting the voltage of the battery from the aftermarket electrical system when the voltage of the battery is below a voltage threshold, and reconnecting the aftermarket electrical system to the voltage of the battery when the battery supplies the voltage to a starter motor.

Other aspects of the invention will become apparent by consideration of the detailed description and accompanying drawings.

BRIEF DESCRIPTION OF THE DRAWINGS

FIG. 3 is an enlarged view of a portion of the schematic of FIG. 2 including the current disconnect.

FIG. 4 is a schematic of the current disconnect.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
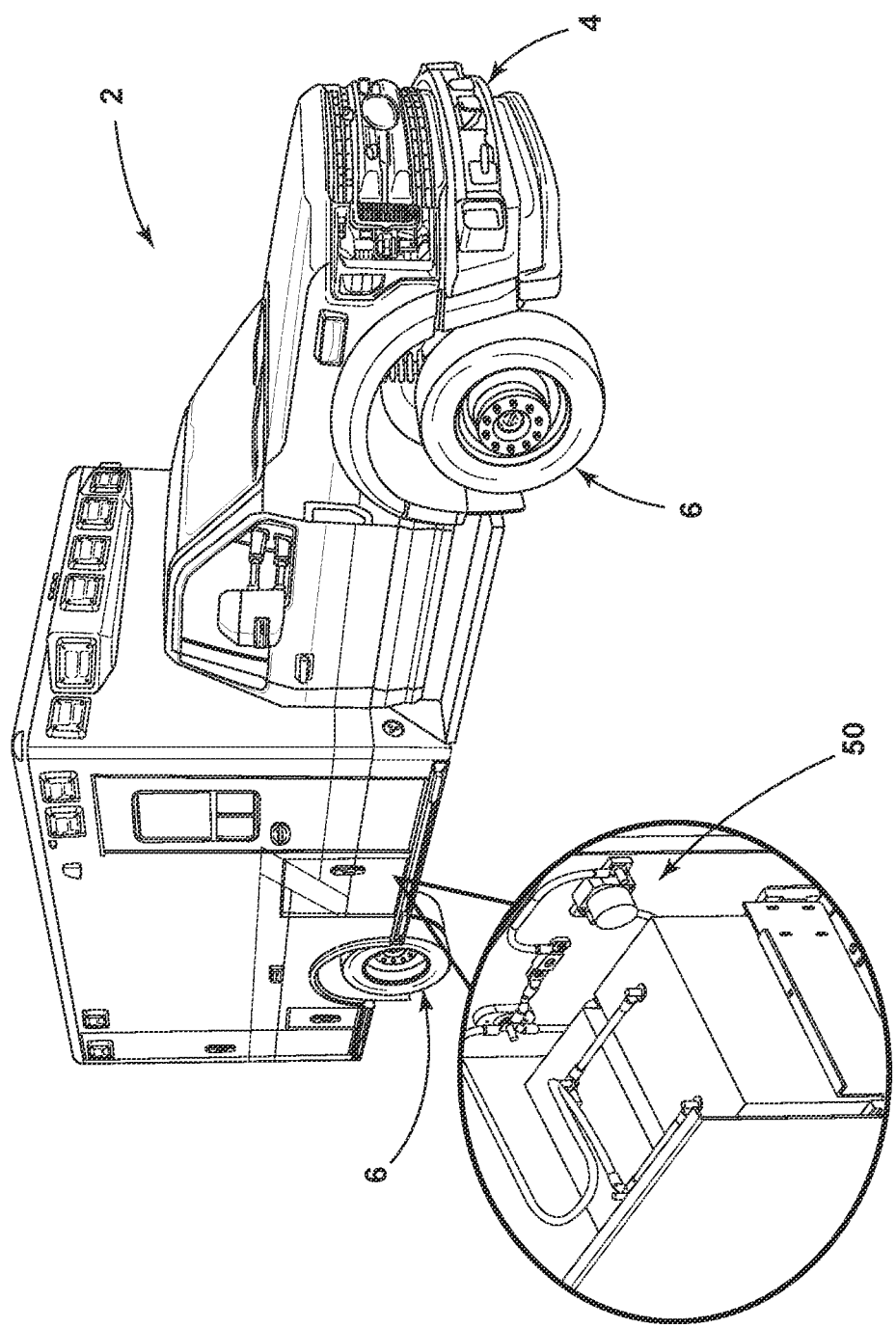
FIG. 1 illustrates an emergency motor vehicle including a chassis supported on wheels and supporting a current disconnect.
Figure 2:
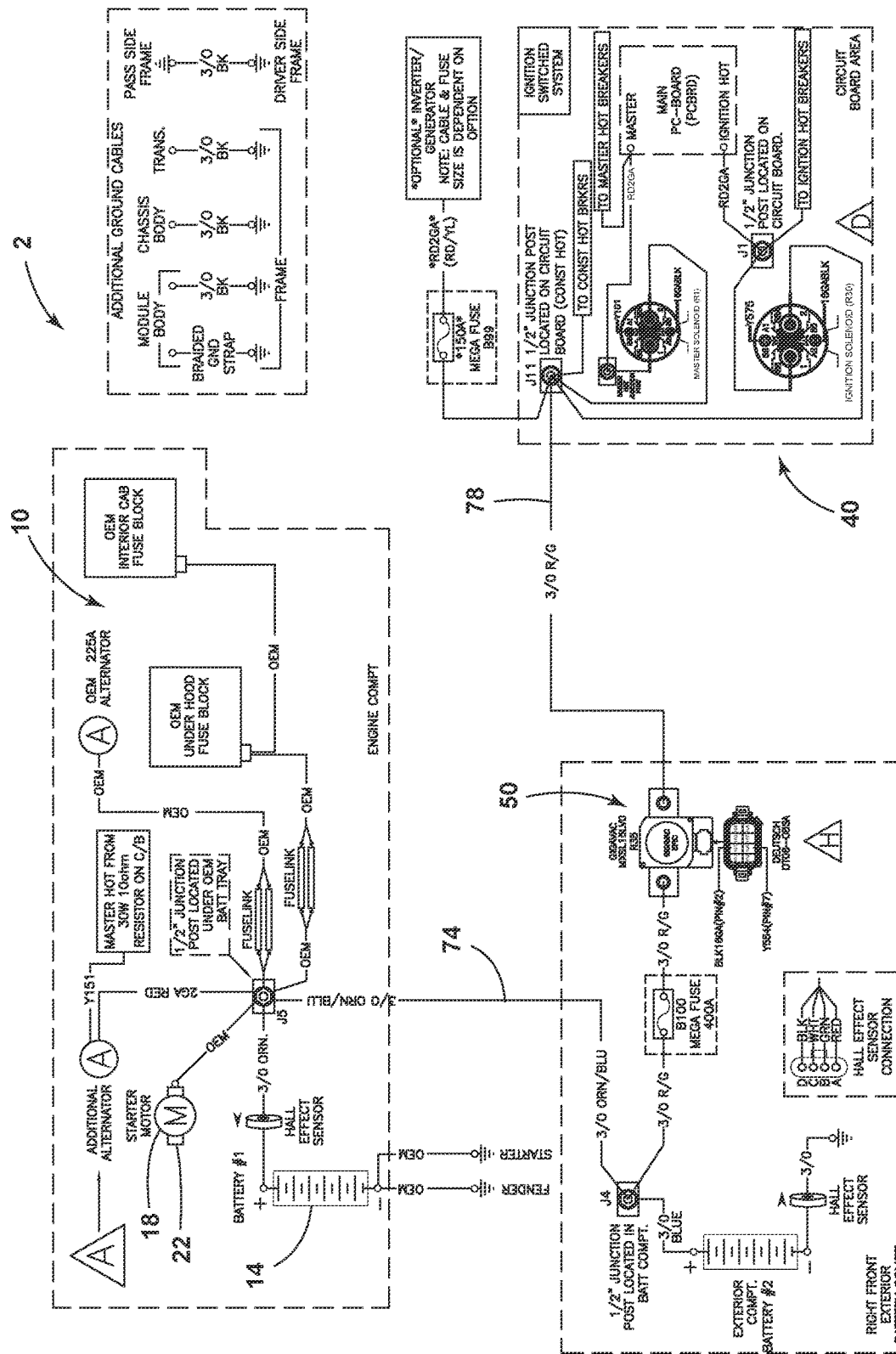
FIG. 2 is a schematic of an electrical system of the emergency motor vehicle of FIG. 1 including the current disconnect.

FIG. 1 illustrates an emergency vehicle 2 (i.e., an ambulance) including an engine (not shown) and a chassis 4 supported on wheels 6. The emergency vehicle 2 also includes an original equipment manufacturer (OEM) electrical system 10. Referring to FIG. 2, the OEM system 10 includes an OEM electrical circuit including a starter motor 18 that is powered by an OEM battery 14. When a user desires to start the emergency vehicle 2 (e.g., by cranking the motor vehicle ignition 22), the OEM battery 14 is configured to supply current to the starter motor 18 to start the engine.

With continued reference to FIG. 2, the illustrated emergency vehicle 2 also includes an aftermarket (AF) system 40 supported on the chassis 4 and that includes an AF electrical circuit that powers additional electrical components, like ambulance litter retention systems, medical refrigerators, and lights (AF components). The AF electrical circuit is coupled to the OEM battery 14, which is configured to supply current to the AF components. Therefore, the AF components are powered by the OEM battery 14. When the engine of the emergency vehicle 2 is running, the OEM battery 14 is charged (e.g., by an alternator) such that the AF components of the AF system 40 do not deplete the OEM battery 14. When the engine of the emergency vehicle 2 is not running, the AF components of the AF system 40 draw power from the OEM battery 14 and, if the battery voltage is drawn too low, the OEM battery 14 may be inadvertently depleted and not have enough charge to start the engine of the emergency vehicle 2 when the ignition 22 is cranked.

With reference to FIGS. 1-3, the emergency vehicle 2 further includes a current disconnect 50 (e.g., a low voltage disconnect) coupled between and in electrical communication with the OEM battery 14 and the AF system 40. The current disconnect 50 of the illustrated embodiment is manufactured by Sensata Technologies, Inc. and sold under the Gigavac trademark under model number MXSL15. The current disconnect 50 is adapted to automatically disconnect the AF system 40 from the OEM battery 14 when the voltage of the OEM battery 14 drops below a voltage threshold for a preset time interval and automatically reconnect the OEM battery 14 to the AF system 40 when a reset condition occurs (e.g., when the vehicle ignition 22 is cranked). That is, the current disconnect 50 is capable of opening the circuit to disconnect the AF system 40 from the OEM battery 14 and closing the circuit to reconnect the AF system 40 and the OEM battery 14. Because the entire AF system 40 is coupled in series to the current disconnect 50, the current disconnect 50 disconnects all of the AF components of the AF system 40 from the OEM battery 14 when the voltage of the OEM battery 14 drops below the voltage threshold for the preset time interval. Additionally, the current disconnect 50 is non-parasitic meaning that it is not powered by the OEM battery 14 when the current disconnect 50 is open. Therefore, when the OEM battery 14 is not connected to the AF system 40, the current disconnect 50 does not draw power from the OEM battery 14, such that the charge of the OEM battery 14 is not further depleted from the current disconnect 50.

With reference to FIGS. 3-4, the current disconnect 50 includes a body 54 having a battery terminal 58 and a load terminal 62 that are in selective electrical communication with each other via a contact 66 that is movable by a solenoid or coil 70 (FIG. 4). The battery terminal 58 couples to and is in electrical communication with the OEM battery 14 (e.g., via a first wire 74), and the load terminal 62 couples to and is in electrical communication with the AF system 40 (e.g., via a second wire 78). The body 54 supports a printed circuit board assembly 82 (PCBA), which includes a controller 86 and a timer 90, as shown in FIG. 4. The controller 86 is programmable to set the voltage threshold and the preset time interval. In the illustrated embodiment, the voltage threshold is 11.6 V and the preset time interval is one minute, but it could also be less, or even zero. The voltage threshold is 11.6 V because this is greater than the voltage of the OEM battery 14 that is necessary to start the starter motor 18. The preset time interval prevents the OEM battery 14 from being unnecessarily disconnected from the AF system 40 (e.g., due to bounce back). In other embodiments, the voltage threshold and the preset time interval could alternatively be set to any desired value, including setting the preset time interval to zero.

With continued reference to FIG. 3, the current disconnect 50 of the illustrated embodiment includes a plurality of pins 100 labelled 101-108 in FIG. 3. The first pin 101 is coupled to the battery terminal 58. The second pin 102 is a ground pin. The sixth pin 106 is coupled to and in electrical communication with the solenoid 70 to facilitate opening the current disconnect 50. The seventh pin 107 is coupled to and in electrical communication with the solenoid 70 to facilitate closing the current disconnect 50. The controller 86 of the current disconnect 50 is capable of sensing voltage of the OEM battery 14 via the battery terminal 58, and will automatically open the solenoid 70 when the voltage of the OEM battery 14 drops below the voltage threshold to disconnect the AF system 40 from the OEM battery 14. In contrast, the current disconnect 50 will close (i.e., reset) when a sufficient voltage (e.g., 12V) is applied to the pin 107. Specifically, the starter motor 18 is coupled to the pin 107 such that powering the starter motor 18 provides a momentary, sufficient voltage (e.g., 12V) to the pin 107, which closes the current disconnect 50 to reconnect the AF system 40 to the OEM battery 14, as described in further detail below.

In other embodiments, the OEM battery 14 may be coupled to the pin 106 via a push-button (not shown), which can be used to manually open and close the current disconnect 50.

In operation, under normal conditions in which the state of charge (SOC) of the OEM battery 14 is at or above the voltage threshold, the current disconnect 50 is closed and the OEM battery 14 powers the AF system 40. That is, the solenoid 70 is energized by voltage from the OEM battery 14 and the movable contact 66 is held in a closed condition. In the closed condition, the movable contact 66 electrically connects the battery terminal 58 to the load terminal 62 such that the OEM battery 14 is connected to and in electrical communication with the AF system 40. The controller 86 monitors the SOC of the OEM battery 14 and disconnects the AF system 40 when the voltage of the OEM battery 14 drops below the threshold voltage for the preset time interval. That is, when the controller 86 detects that the voltage of the OEM battery 14 drops below the voltage threshold and the timer 90 times out the preset time interval, the solenoid 70 is automatically de-energized such that the movable contact 66 moves from the closed position to the open position to disconnect the AF system 40 from the OEM battery 14. In the open condition, the movable contact 66 is spaced away from (e.g., disengages) the battery terminal 58 and the load terminal 62 such that the OEM battery 14 is not connected to or in electrical communication with the AF system 40. Also, in the open condition, the controller 86 of the current disconnect 50 is not coupled to or in electrical communication with the OEM battery 14, such that the current disconnect 50 is non-parasitic and does not draw power from the OEM battery 14. Disconnecting the OEM battery 14 from the AF system 40 protects the OEM battery 14 from being drained to the point of not allowing the OEM battery 14 to power the starter motor 18 to start the vehicle engine.

The current disconnect 50 is reset (i.e., closed) as a result of activating the starter motor 18. When the vehicle ignition 22 is cranked, a voltage signal (e.g., 12 V) that results from powering the starter motor 18 "re-sets" or re-energizes the solenoid 70 to move the movable contact 66 to the closed condition, at which point the solenoid 70 will stay energized and the movable contact 66 will stay closed until the OEM battery 14 voltage again drops below the voltage threshold for the duration of the preset time interval.

Various features and advantages of the invention are set forth in the following claims.

What is claimed is:

1. A motor vehicle comprising:
   a chassis supported on wheels;
   a battery having a voltage and supported by the chassis;
   a first electrical circuit supported on the chassis and configured to receive current from the battery; and
   a second electrical circuit supported on the chassis and configured to receive current from the battery, the second electrical circuit including a current disconnect that is switchable between an open condition, in which the second electrical circuit is disconnected from the battery when the voltage falls below a voltage threshold, and a closed condition, in which the second electrical circuit is connected to the first electrical circuit when a reset condition occurs,
   wherein the current disconnect includes a controller that receives a signal indicative of the voltage of the battery, the controller configured to automatically switch the current disconnect into the open condition to disconnect the second electrical circuit from the battery when the voltage of the battery falls below the voltage threshold, and wherein the controller is not powered by the battery in the open condition.

2. The motor vehicle of claim 1, further comprising a starter motor, and wherein the reset condition includes powering the starter motor.

3. The motor vehicle of claim 2, wherein powering the starter motor causes the current disconnect to move to the closed condition, thereby reconnecting the battery and the second electrical circuit.

4. The motor vehicle of claim 1, wherein the current disconnect is maintained in the closed condition via the voltage from the battery when the voltage is above the voltage threshold.

5. The motor vehicle of claim 1, wherein the second electrical circuit does not draw current from the battery when the current disconnect is in the open condition, such that the battery is unaffected by the second electrical circuit.

6. The motor vehicle of claim 1, wherein the current disconnect is switchable to the open condition when the voltage falls below a voltage threshold for a preset time interval.

7. The motor vehicle of claim 6, wherein the voltage threshold is approximately 11.6 volts.

8. The motor vehicle of claim 6, wherein the preset time interval is approximately 60 seconds.

9. The motor vehicle of claim 6, wherein the current disconnect includes a timer that begins counting the preset time interval when the voltage falls below the voltage threshold.

10. The motor vehicle of claim 1, wherein the current disconnect includes a battery terminal electrically connected to the battery, a load terminal electrically connected to the second electrical circuit, a solenoid, and a contact that is moveable via the solenoid to selectively place the battery terminal and the load terminal in electrical communication.

11. The motor vehicle of claim 10, wherein the contact engages both the battery terminal and the load terminal to establish electrical communication between the battery and the second electrical circuit when the solenoid is energized by the voltage.

12. The motor vehicle of claim 10, wherein the contact disengages at least one of the battery terminal and the load terminal to terminate electrical communication between the battery and the second electrical circuit when the solenoid is de-energized from a lack of the voltage.

13. The motor vehicle of claim 12, wherein the controller automatically de-energizes the solenoid when the voltage of the battery falls below the voltage threshold for a preset time interval to disconnect the second electrical circuit from the battery.

14. A method of selectively powering an aftermarket electrical system for a motor vehicle using a battery of the motor vehicle, the motor vehicle including a chassis supported on wheels, the battery having a voltage an supported by the chassis, a first electrical circuit supported on the chassis and configured to receive current from the battery, the after-market electrical system supported on the chassis and configured to receive current from the battery, the after-market electrical system including a current disconnect that is switchable between an open condition, in which the second electrical circuit is disconnected from the battery when the voltage falls below a voltage threshold, and a closed condition, in which the second electrical circuit is connected to the first electrical circuit when a reset condition occurs, the method comprising:

supplying, via a controller of the current disconnect, a voltage from the battery to the aftermarket electrical system when the voltage of the battery is above a voltage threshold;

disconnecting, via the controller of the current disconnect, the voltage of the battery from the aftermarket electrical system when the voltage of the battery is below a voltage threshold, the controller being unpowered by the battery when the aftermarket electrical system is disconnected; and reconnecting, via the controller of the aftermarket electrical system, the aftermarket electrical system to the voltage of the battery when the reset condition occurs, wherein the battery supplies the voltage to a starter motor when the reset condition occurs.

15. The method of claim 14, wherein disconnecting the voltage of the battery from the aftermarket electrical system occurs when the voltage of the battery is below the voltage threshold for a preset time interval.

16. The method of claim 15, further comprising counting the preset time interval with a timer that is initiated when the voltage of the battery is below the voltage threshold.

17. The method of claim 14, further comprising detecting, by the controller, the voltage of the battery.

18. The method of claim 14, further comprising the aftermarket electrical system drawing no current from the battery after disconnecting the voltage of the battery from the aftermarket electrical system.

19. The method of claim 14, further comprising closing a circuit between the battery and the aftermarket electrical system when the voltage of the battery is above a voltage threshold.

20. The method of claim 19, further comprising opening the circuit between the battery and the aftermarket electrical system when the voltage of the battery is below a voltage threshold for a preset time interval.

* * * * *